United States Patent [19]

Snyder, Jr.

[11] Patent Number: 5,119,688
[45] Date of Patent: Jun. 9, 1992

[54] PORTABLE DEVICE FOR THE HAND OPERATION OF A MOTOR VEHICLE ACCELERATOR PEDAL

[76] Inventor: Vincent Snyder, Jr., 1052 Clovernoll Ct., Marysville, Ohio 43040

[21] Appl. No.: 530,202

[22] Filed: May 30, 1990

[51] Int. Cl.$^5$ ............... A45B 3/00; G05G 7/02
[52] U.S. Cl. .................. 74/482; 135/66; 135/77; 294/19.1; 403/392
[58] Field of Search ............. 294/19.1, 99.1, 24, 294/31.2, 33, 100, 148, 153, 156, 166; 74/481, 482, 548; 135/66, 65, 75, 77, 78, 86; 81/64, 488; 119/153; 403/392, 398

[56] References Cited

U.S. PATENT DOCUMENTS

| | | | |
|---|---|---|---|
| 889,474 | 6/1908 | Medley | 294/19.1 X |
| 1,716,814 | 6/1929 | Case | |
| 1,780,060 | 10/1930 | Bluff | 403/392 X |
| 1,983,425 | 12/1934 | Willis | 294/19.1 X |
| 2,481,966 | 9/1949 | Zivi | 74/481 |
| 2,526,084 | 10/1950 | Penn | 294/99.1 X |
| 2,666,510 | 1/1954 | Pokorny | 192/3 |
| 2,707,886 | 5/1955 | Lerman | 74/481 |
| 2,777,335 | 1/1957 | Engberg et al. | 74/481 |
| 2,783,659 | 3/1957 | Kelsey et al. | 74/481 |
| 2,826,089 | 3/1958 | Hammack | 74/484 |
| 2,855,797 | 10/1958 | Dunn | 74/484 |
| 2,866,356 | 12/1958 | Elam | 74/532 |
| 2,930,250 | 3/1960 | Atran | 74/482 |
| 2,960,885 | 11/1960 | Donaldson | 74/482 |
| 3,065,647 | 11/1962 | Whitmore | 74/481 |
| 3,093,402 | 6/1963 | Sisson | 135/66 X |
| 3,153,350 | 10/1964 | Dishart | 74/482 |
| 3,199,365 | 8/1965 | Cameron et al. | 74/482 |
| 3,273,927 | 9/1966 | Carlson | 294/99.1 X |
| 3,442,149 | 5/1969 | Schwendenmann | 74/481 |
| 3,467,116 | 9/1969 | Ringewaldt | 294/19.1 |
| 3,977,422 | 8/1976 | Cabaluna | 135/66 X |
| 3,993,013 | 11/1976 | Nunziato et al. | 294/19.1 X |
| 4,424,723 | 1/1984 | Gockel | 74/482 |
| 4,438,835 | 3/1984 | Dowden | 192/3 M |
| 4,519,643 | 5/1985 | Harris | 294/19.1 |
| 4,627,522 | 12/1986 | Ulrich et al. | 192/35 |
| 4,788,879 | 12/1988 | Ulrich | 74/481 |
| 4,811,750 | 3/1989 | McAllister | 135/66 |
| 4,932,699 | 6/1990 | Hobson | 294/19.1 |

Primary Examiner—Johnny D. Cherry

[57] ABSTRACT

A portable device for the hand operation of an accelerator foot pedal of a motor vehicle is disclosed. The device is comprised of a handle, an adjustable, telescoping control rod and a cane tip assembly which provides for a flexible attachment to couple the control rod to the accelerator pedal.

4 Claims, 2 Drawing Sheets

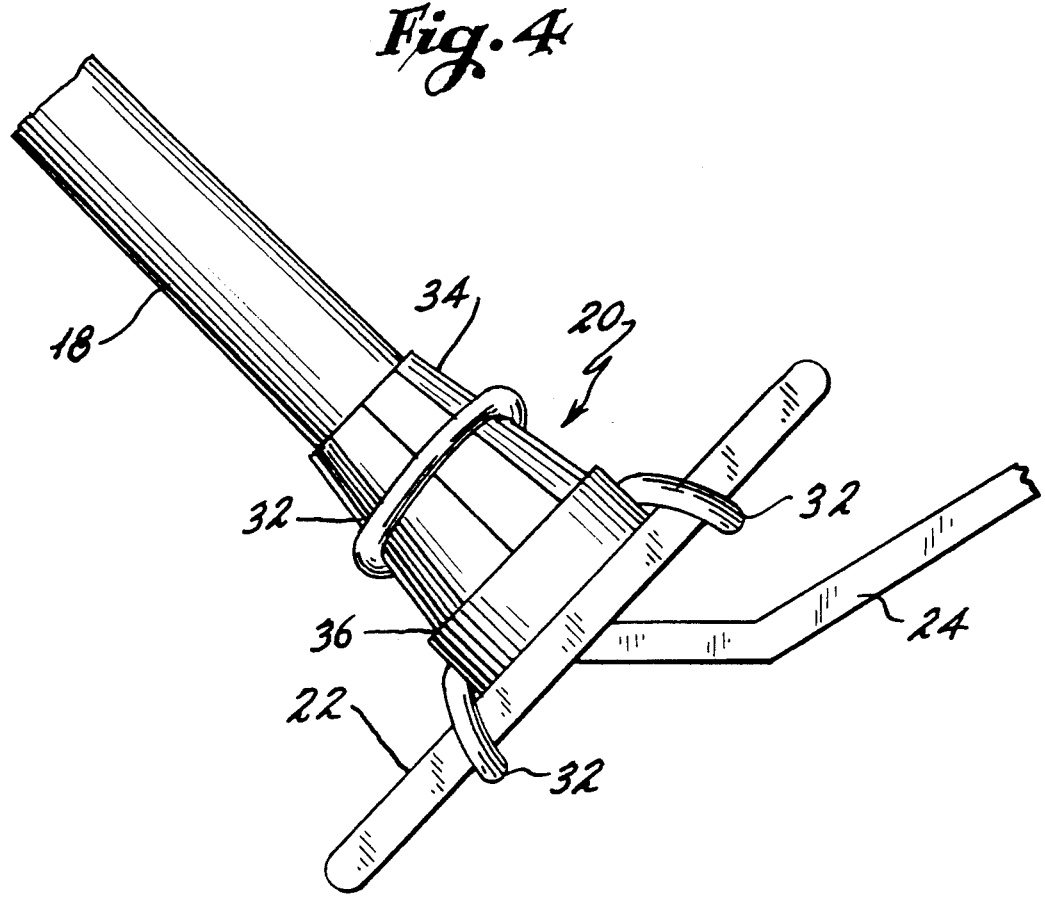
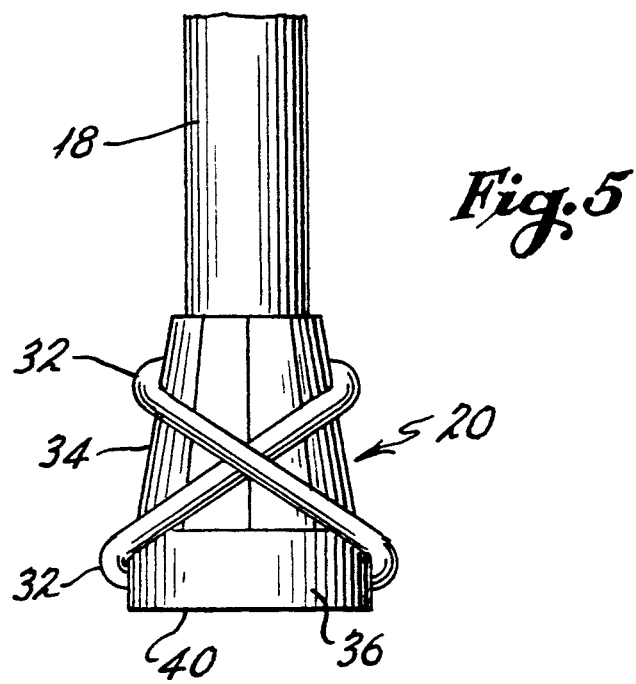

PORTABLE DEVICE FOR THE HAND OPERATION OF A MOTOR VEHICLE ACCELERATOR PEDAL

BACKGROUND

1. Field of Invention

The invention relates to the hand control of a motor vehicle accelerator using a portable device by which a handicapped person who does not have use of both feet may safely drive a motor vehicle which has been equipped with an automatic transmission.

2. Discussion of Prior Art

Heretofore, the handicapped individual who has suffered the temporary or permanent loss of the use of a leg or foot has found the limited driving aids available to operate the accelerator of a motor vehicle cumbersome and lacking in portability. Hand control devices which require extensive vehicle modification or permanent installation are impractical in situations where the use of a vehicle is only temporary such as with a rental car or where the individual is not permanently handicapped such as would be the case with a foot in a cast. Futhermore, individuals that require mobility assistance from a cane or a set of crutches are often limited in their ability to physically carry and independently install any additional device needed to control the speed of their vehicle. Finally, a permanently installed accelerator device may impede or hinder the safe operation of the vehicle by non-handicapped drivers.

None of the prior art cited in this invention satisfies the need to provide a portable accelerator control device that is readily adaptable to any vehicle without the use of tools and is easy for the handicapped driver to carry without interfering with cane or crutch-assisted walking. Patents by Lerman (U.S. Pat. No. 2,707,886; 1955), Engberg et al. (U.S. Pat. No. 2,777,335; 1957), Kelsey et al. (U.S. Pat. No. 2,783,659; 1957), Hammack (U.S. Pat. No. 2,826,089; 1958), Dunn (U.S. Pat. No. 2,855,797; 1958), Whitmire (U.S. Pat. No. 3,065,647; 1962), Schwendenmann (U.S. Pat. No. 3,442,149; 1969), Dowden (U.S. Pat. No. 4,438,835; 1984) and Ulrich et al. (U.S. Pat. No. 4,627,522; 1986) all reveal complex dual brake and accelerator mechanisms which are permanently installed. Gockel (U.S. Pat. No. 4,424,723; 1984) and Ulrich (U.S. Pat. No. 4,788,879; 1988) both show dual brake and accelerator control devices that claim portability but would be both unwieldy for the handicapped individual to carry and difficult to install.

Case (U.S. Pat. No. 1,716,814; 1929) shows a complex, permanently installed, auxillary hand throttle which was intended to be used with floor-mounted, manual transmission vehicles.

Later throttle control devices were actually early attempts to develop cruise control mechanisms. Patents by Pokorny (U.S. Pat. No. 2,666,510; 1954), Atran (U.S. Pat. No. 2,930,250; 1960), Donaldson (U.S. Pat. No. 2,960,885; 1960) and Dishart (U.S. Pat. No. 3,153,350; 1964) all illustrate devices that were intended to relieve the right foot during long trips. While these devices may be portable to the non-handicapped individual, they lack ease of portability for an individual whose hand(s) may be occupied with locomotion assistance aids such as a cane or crutch. Furthermore, all four devices are intended to maintain the vehicle at a fixed speed once the desired speed is attained. None of these devices were intended by their inventors to provide variable speed regulation through acceleration/deceleration phases of vehicle operation as would be obtained during normal right-footed accelerator use.

Cameron et al (U.S. Pat. No. 3,199,365; 1965) reveal a throttle control device with a telescopic handle that is attached to the gas pedal linkage by means of a complex, threaded clamp mechanism which would require tools for installation. Similiarly, Zivl (U.S. Pat. No. 2,481,966; 1949) makes uses of a complex operating handle which purperts ease of installation for the control of either a brake or accelerator but offers no other additional utility and would continue to burden the handicapped during transit.

OBJECTS AND ADVANTAGES

Objects and advantages of this invention are:

(a) to provide a portable accelerator control device that is easy for a handicapped individual to carry and install.

(b) to provide a portable accelerator control device that is inexpensive to build and easily adapted to different motor vehicles without the use of tools.

(c) to provide a portable accelerator control device that also aids in locomotion assistance when not in use on a vehicle.

(d) to provide a portable accelerator control device which is not permanently installed and does not interfer with the safe operation of the vehicle by non-handicapped drivers.

BRIEF DESCRIPTION OF THE DRAWINGS

FIG. 4 depicts a side view of the accelerator pedal and linkage with the cane tip assembly attached.

FIG. 5 depicts a view of the cane tip assembly with the accelerator band stored in a coiled position.

Figure 1:
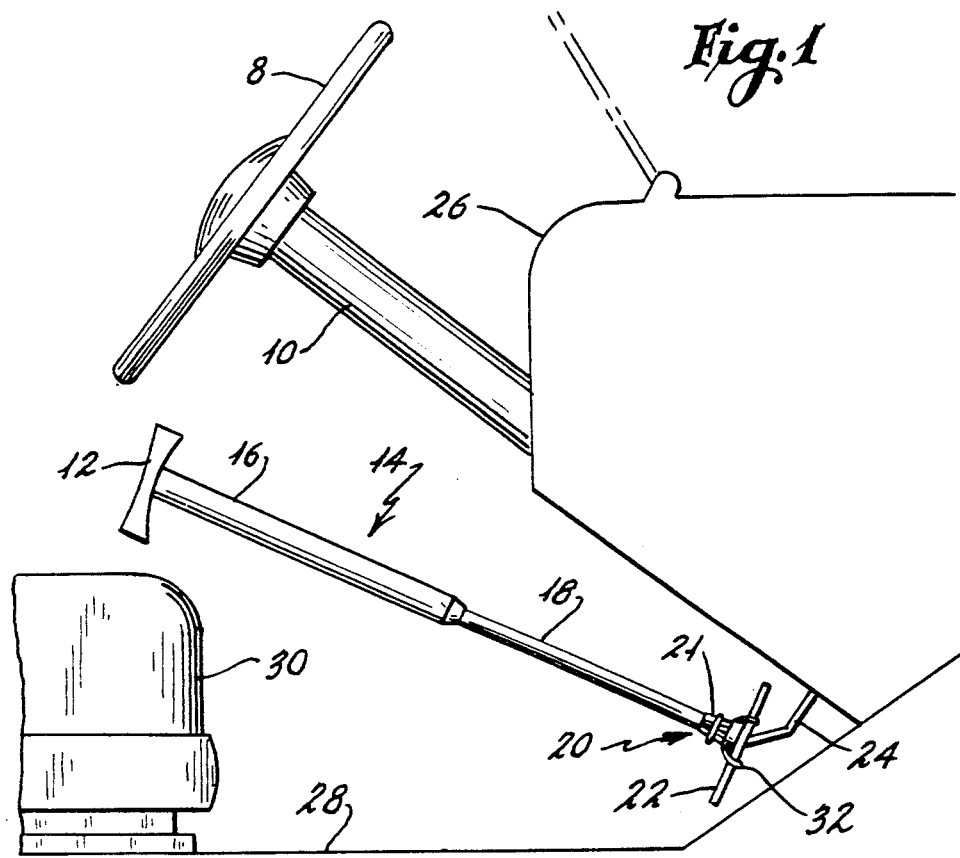
FIG. 1 depicts a schematic side perspective view of the driver's compartment showing the use of the portable control device attached to the accelerator pedal.

LIST OF REFERENCE NUMERALS IN DRAWING 8 steering wheel
10 steering column
12 handle
14 control rod
16 upper member
18 lower member
20 cane tip assembly
21 cane tip
22 accelerator pedal
24 accelerator linkage
26 dash board
28 floor board
30 driver's seat
32 accelerator band
34 cane tip neck
36 cane tip base
38 cane tip passage
40 base bottom
42 base hole transect

DESCRIPTION

FIGS. 1 to 5

Referring now in detail to the drawings wherein like parts are designated by like reference numerals throughout, there is illustrated in FIG. 1 a side perspective view of the driver's compartment of a motor vehicle including the basic elements of a steering wheel 8, a steering column 10, a dash board 26, a floor board 28, a driver's seat 30 and an accelerator pedal 22. Furthermore, FIG. 1 reveals the preferred elements of the invention consisting of a handle 12, a control rod 14 and a cane tip assembly 20 attached to the accelerator pedal 22. The handle 12 which is intended to be grasped by the right hand is rigidly affixed to an upper member 16. The upper member 16 is one of a plurality of hollow, cylindrical, telescoping sections which join to form a control rod 14. Each section of the control rod 14 extends telescopically to provide for an adjustable length. The basal section of the control rod 14 is referred to as a lower member 18. The cane tip assembly 20 is attached to the lower member 18 and is coupled with the accelerator pedal 22.

Figure 2:
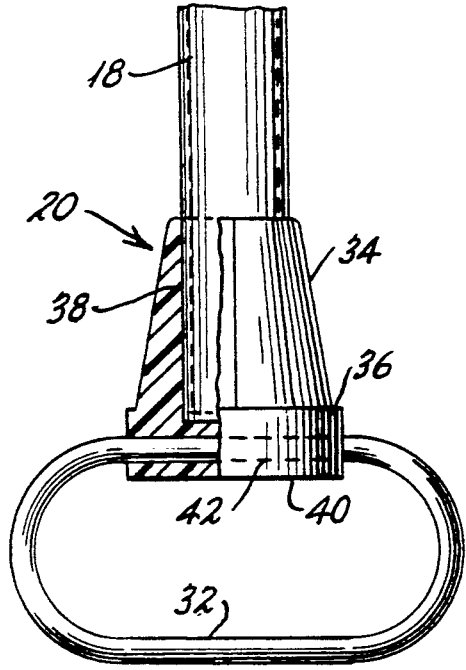
FIG. 2 discloses a cross-sectional view of the lower member with the cane tip assembly attached and with the accelerator band in a flaccid position.

FIG. 2 provides a cross-sectional view of the cane tip assembly 20 attached to the lower member 18 with an accelerator band 32 in a flacid position. The preferred embodiment of the cane tip assemby 20 consists of a cane tip 21 and a flexible, elastic accelerator band 32. The cane tip 21 is preferably molded in a single piece of rubber or other suitable resilient material and has as part of its structure an elongated, cylindrical, hollow cane tip passage 38 to receive the terminus of the lower member 18. To attach the cane tip 21 to the control rod 14, the terminus of the lower member 18 is inserted into the passage 38. The structure and composition of the cane tip 21 allow for repeated attachment and detachment from the lower member 18. The cane tip 21 has as part of its structure, a thick cane tip base 36 and a base bottom 40 that is generally flat. FIG. 2 also reveals the band 32 as it transects through the base 36. The preferred configuration of the band 32 is an elastic tube such as surgical tubing or other similiar flexible and elastic material. The band 32 transects the base 36 through a hole 42 bored between the base bottom 40 and the base of the passage 38 and forms a complete, closed loop with the base 36.

Figure 3:
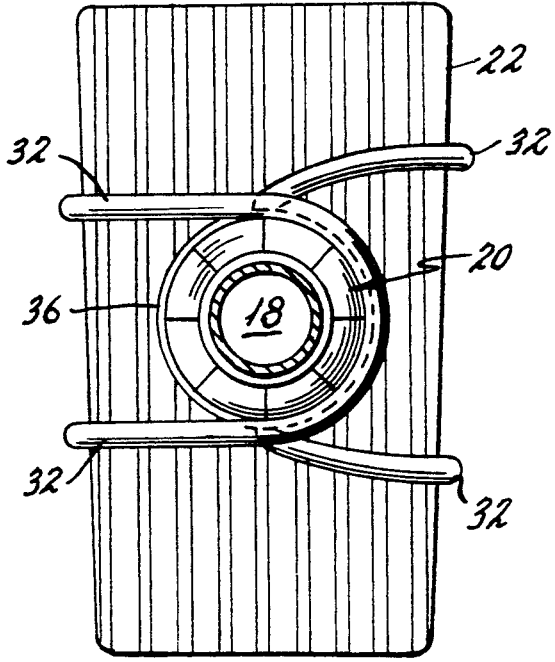
FIG. 3 depicts an overhead view of the cane tip and accelerator band positioned on the accelerator pedal.

FIGS. 3 and 4 illustrate how the cane tip assembly 20 is coupled to the accelerator pedal 22. FIG. 3 is an overhead view and FIG. 4 is a side view which reveal how the base bottom 40 is positioned in the center of the upper surface of the pedal 22 and held in that position by the band 32. The band 32 traverses the pedal 22 and loops around the cane tip neck 34 to complete the attachment.

FIG. 5 is a view of the cane tip assembly 20 with the band 32 in a coiled position looped around the neck 34.

OPERATION

FIGS. 1, 3, 4 and 5

FIG. 1 demonstrates how the invention is used in relation to the driver's compartment. In order to attach the portable accelerator device in this invention, the cane tip assembly 20 must first be removed from the lower member 18 of the control rod 14 and coupled with the accelerator pedal 22. For accelerator pedals 22 that are connected to the accelerator linkage 24 at a single point near the center of the bottom of the pedal, this coupling is accomplished by first looping the accelerator band 32 over the longitudinal top of the pedal 22. The band 32 is then looped around the longitudinal base of the pedal 22 so that the accelerator linkage 24 is now contained within the closed loop of the band 32 and base 36. The base 36 is positioned in direct contact with the center of the pedal 22 surface and oriented so that the base hole 42 parallels the longitudinal orientation of the pedal 22. The elastic loop of the band 32 is stretched completely around the body of the pedal 22 and looped over the neck 34 to complete the coupling (FIGS. 3 and 4). The lower member 18 is re-inserted into the passage 38 and serves to prevent the band 32 from slipping back over the neck 34 and off the pedal 22. The length and the elasticity of the band 32 hold the base bottom 40 in constant contact with the surface of the pedal 22 and prevent accidental dislodgement from the pedal. This coupling also provides a flexible linkage which allows the handle 12 to be held in the right hand of the driver at various positions and orientations. The control rod 14 is then adjusted to a proper length that facilitates comfortable grasping of the handle 12. The driver may now safely control the accelerator by pushing on the handle 12 to depress the pedal 22.

FIG. 5 reveals how the length, flexibility and elasticity of band 32 enables it to be coiled over the neck 34 of the cane tip 21 when not in use as an accelerator control device. When the cane tip assembly 20 is installed on a cane or cane/crutch combination in this coiled storage position, it maintains its function as a cane or crutch tip used for locomotion assistance without interference from the band 32.

SUMMARY, RAMIFICATIONS, AND SCOPE

The invention described above has the advantages of providing the handicapped individual with a truly portable accelerator control device that is simple, inexpensive to build, light weight and easy to carry. Because it incorporates the use of a cane in its design, it eliminates the need for the handicapped person to carry an additional control rod mechanism. The use of the flexible, elastic band enables the driver to maintain continuous contact with the accelerator pedal and thus provide safe control of the vehicle. The length, flexibility and elasticity of the accelerator band enable the device to adapt to any motor vehicle accelerator pedal while allowing the cane tip assembly to be installed on the tip of a cane or crutch for use as a walking aid when the band is coiled in the storage position. In addition, the small size of the cane tip assembly allows it to fit easily within a shirt pocket when not in use. Attaching the cane tip assembly to a plurality of telescoping sections enables the device to adjust the length of the control rod to adjust to any vehicle. This invention is easily installed in any vehicle without the need of tools. While the description above includes many specificities, it should not be construed as limiting the scope of this invention. For example, the cane tip assembly could be installed on a combination cane/crutch mechanism. In addition, the shape and structures of the cane tip may vary from that presented in the drawings. Also, the installation steps, as described above may vary due to differences in the mounting detail of the accelerator pedal. Furthermore, the accelerator band assembly could be constructed of a variety of materials other than surgical tubing which may be solid or other than tubular in shape and nature. In addition, the accelerator band could be detachable from the cane tip rather than fixed or permanent. Thus, the scope of the invention should be determined by the claims and their legal equivalents, rather than the examples given.

I claim:

1. A portable device for attaching a walking cane having a handle, a control rod having a plurality of telescoping members which extend to adjust to various lengths with said handle attached to the end of an upper member and a cane tip made of resilient material and attached to the end of a lower member of said control rod to a motor vehicle accelerator pedal and comprising:

a flexible, elastic band means for providing a flexible linkage between said cane and said pedal, whereby said band is stretched completely around said pedal and looped around said cane forming a closed loop with said cane tip safely positioned in direct, continuous contact with said accelerator pedal.

2. A portable device for attaching a walking cane having a handle and a control rod having a plurality of telescoping members which extend to adjust to various lengths with said handle attached to the end of an upper member to a motor vehicle accelerator pedal, said device comprising:

(a) a cane tip made of resilient material;
(b) said tip having an elongated, cylindrical, hollow cane tip passage for providing a coupling means between said tip and a lower member of said control rod;
(c) a cane tip base;
(d) a flexible, elastic band attached to said cane tip and forming a complete, closed loop;
(e) said band being selectively either coiled around said cane tip during use of said device as a cane tip or uncoiled therefrom to form a coupling means for providing a flexible linkage between said base and said pedal whereby said band is stretched completely around said pedal and looped around said cane tip forming a closed loop with said cane tip base safely positioned in direct, continuous contact with said pedal.

3. The portable device according to claim 2, wherein said flexible, elastic band transects said base through a hole adjacent to the bottom thereof forming said complete, closed loop.

4. A combination cane and hand control device for the safe operation of a motor vehicle accelerator pedal, said device being easily transported by a handicapped person and used as a walking cane when not in use as an accelerator control instrument, inexpensive to build, and readily adaptable from one vehicle to another without the use of tools to install comprising:

(a) a handle;
(b) a control rod having a plurality of telescoping members which extend to adjust to various lengths with said handle attached to the end of an upper member;
(c) a cane tip assembly removably attached to the end of a lower member of said control rod having a cane tip made of resilient material, a cane tip base and a flexible, elastic band transecting said base through a hole adjacent to the bottom thereof and forming a complete, closed loop;
(d) said band being selectively either coiled around said cane tip during use of said device as a cane or uncoiled therefrom to form a coupling means for providing a flexible linkage between said cane tip assembly and a motor vehicle accelerator pedal.

* * * * *